US00RE41716E

(19) United States
(12) Reissued Patent
Fernando et al.

(10) Patent Number: US RE41,716 E
(45) Date of Reissued Patent: Sep. 21, 2010

(54) MODULAR SIGNATURE AND DATA-CAPTURE SYSTEM AND POINT OF TRANSACTION PAYMENT AND REWARD SYSTEM

(75) Inventors: Llavanya Fernando, San Jose, CA (US); Abbas Rafii, Los Altos, CA (US); Nicholas Williams, San Francisco, CA (US); Eric A. Bunn, San Jose, CA (US); Aziz Valliani, Fremont, CA (US)

(73) Assignee: Symbol Technologies, Inc., Holtsville, NY (US)

(21) Appl. No.: 10/377,830
(22) Filed: Feb. 27, 2003

Related U.S. Patent Documents

Reissue of:
(64) Patent No.: 6,193,152
Issued: Feb. 27, 2001
Appl. No.: 08/853,955
Filed: May 9, 1997

(51) Int. Cl.
*G06K 5/00* (2006.01)

(52) U.S. Cl. ..... 235/380; 235/379; 235/383; 235/385; 235/451

(58) Field of Classification Search ..... 235/380, 235/379, 383, 385, 492, 493, 494, 449, 451, 235/440; 902/2, 3, 5, 20, 18, 26, 27
See application file for complete search history.

(56) References Cited

U.S. PATENT DOCUMENTS 4,058,839 A * 11/1977 Darjany ..... 235/493 X
4,385,285 A * 5/1983 Horst et al. ..... 235/379 X
4,386,266 A * 5/1983 Chesarek ..... 235/380
4,882,675 A * 11/1989 Nichtberger et al. .... 235/381 X
4,982,346 A * 1/1991 Girouard et al. ..... 235/383 X
4,993,068 A * 2/1991 Piosenka et al. ..... 235/380 X
4,995,086 A * 2/1991 Lilley et al. ..... 235/380 X
5,175,682 A * 12/1992 Higashiyama et al. .. 235/379 X
5,195,133 A * 3/1993 Kapp et al. ..... 235/380 X
5,233,547 A * 8/1993 Kapp et al. ..... 235/380 X
5,288,976 A * 2/1994 Citron et al. ..... 235/375
5,313,051 A 5/1994 Brigida et al.
5,428,210 A * 6/1995 Nair et al. ..... 235/380 X
5,432,326 A * 7/1995 Noblett, Jr. et al. ..... 235/380
5,448,044 A * 9/1995 Price et al. ..... 235/380
5,448,047 A * 9/1995 Nair et al. ..... 235/440
5,459,306 A * 10/1995 Stein et al. ..... 235/383
5,488,575 A * 1/1996 Danielson et al. ..... 364/707
5,509,083 A * 4/1996 Abtahi et al. ..... 235/380 X
5,536,930 A * 7/1996 Barkan et al. ..... 235/472.01
5,559,313 A * 9/1996 Claus et al. ..... 235/380
5,559,885 A * 9/1996 Drexler et al. ..... 235/380 X
5,587,560 A * 12/1996 Crooks et al. ..... 235/380 X
5,592,560 A * 1/1997 Deaton et al. ..... 235/375 X
5,594,226 A * 1/1997 Steger ..... 235/379
5,617,343 A * 4/1997 Danielson et al. ..... 364/707
5,640,002 A * 6/1997 Ruppert et al. ..... 235/383 X
5,650,761 A * 7/1997 Gomm et al. ..... 235/380 X
5,756,978 A * 5/1998 Soltesz et al. ..... 235/380
5,778,067 A * 7/1998 Jones et al. ..... 235/380 X

* cited by examiner

*Primary Examiner*—Karl D. Frech

(57) ABSTRACT

A modular signature and data capture device employs a standardized ISA bus, standardized communication ports, and standardized ×86 CPU architecture to promote flexibility in using past, present, and future software and accessories. A VGA-caliber backlit LCD is superimposingly combined with a pressure touch pad that is useable with a passive stylus. The LCD displays pen drawn signatures and graphics in real-time, and can display images and data stored in the device, or downloaded from a host system, including advertisements. The LCD can also display menus, device instructions, virtual pressure-sensitive data keys, and control keys. The device includes a built-in a three-stripe magnetic card reader unit. The device accepts PCMCIA-compatible accessories including solid state memory units and smartcards, and is compatible with plug-in accessories including an external PIN keypad entry unit, a fingerprint unit, an omnibus unit including a printer and check processor in addition to a fingerprint unit. Security is provided by DES-encrypting PIN data and/or using Master/Session and/or DUKPT key management, or by using fingerprint token data as a PIN. The invention may be used to conduct paperless transactions in which the merchant is paid in realtime. Further, merchant purchase profiles may be generated on a per-user basis to promote more effective advertising.

33 Claims, 5 Drawing Sheets

MODULAR SIGNATURE AND DATA-CAPTURE SYSTEM AND POINT OF TRANSACTION PAYMENT AND REWARD SYSTEM

Matter enclosed in heavy brackets [ ] appears in the original patent but forms no part of this reissue specification; matter printed in italics indicates the additions made by reissue.

FIELD OF THE INVENTION

The invention relates generally to signature and data-capture equipment, and more particularly to such equipment providing a modular system capability, and providing capability to transact payment at point of transaction, and to issue a reward to a user of the system.

BACKGROUND OF THE INVENTION

Equipment that captures signature and other information drawn on a screen by a user is known in the art. For example, many businesses are beginning to adopt electronic equipment that captures a customer's signature to verify a credit card charge purchase. At a store or other point of transaction, the customer signs his or her name with a stylus on a screen surface. The screen surface responds to signals from the stylus or to force from the stylus. The signature data are collected and signal processed within the equipment for transmission, typically by telephone link, to a central office. One such signature collection product is the Pen Ware 2000, a commercially available product marketed by PenWare Corp. of Sunnyvale, Calif.

At the central office, pre-stored data representing a genuine signature for the user are compared against the new data to confirm or deny authenticity of the new signature. The central office then transmits signature authenticity confirmation or denial back to the equipment at the point of transaction. If desired, the same central office and information link can be used to signal the customer's present credit limit back to the point of transaction as well.

Many prior art systems use active capture technology, that often is relatively complex and expensive, and are not very robust. Such active capture technologies include use of an infra-red ("IR") emitting active stylus and a signature capture pad that includes an array of IR detectors, or magnetic stylus and capacitive-based signature capture pad.

Such equipment should be backward-compatible with existing signature and data-capture equipment, and should be compatible with the software command sets embedded in such existing equipment.

Some signature capture systems include a sub-system for reading the magnetic track on a credit card, a debit card, or the like. Generally, to store more data on such cards, the industry is moving toward providing such cards with three strips of magnetic media on which data may be stored. Unfortunately many prior art systems do not accommodate more than a single strip magnetic card reader. Further, prior art techniques for providing user security when using such cards frequently are limited to the use of personal identification numbers ("PINs"), which numbers can become lost or compromised.

In the area of computer architecture, current design has evolved to accommodate standard buses, standard expansion slots and ports, and standardized add-on components. Unfortunately, prior art signature pad capture systems have tended to exhibit a closed architecture design that does not readily provide for standardized input and output signals and peripheral devices.

When used in a commercial environment such as a store, such systems do not appreciably help the merchant in terms of reducing paperwork and expediting cash flow. Although at the moment of payment the merchant temporarily has the user's complete attention, such systems do not readily enable the merchant to promote further and additional sales, for example by displaying on the system appropriate advertising and/or rewards, such as coupons for discounts on present or future purchases.

Thus there is a need for a signature capture product and system that preferably employs backward-compatible standardized architecture, that can interface with a variety of input/output and other peripheral devices. Preferably such device should read and write to a card bearing three magnetic stripes, and/or to a smartcard, and use a passive stylus. Further, such product should have the ability to provide security beyond that associated with PIN identification. In addition, the system should be useable to display merchant advertising and to issue rewards to the user, commensurate with the nature of the immediate purchase. Finally, such system should be useable to facilitate instant transaction payment to a merchant, while minimizing paperwork, and should be able to assist a user in maintaining computerized financial data relating to transactions made using the present invention.

The present invention provides such a product and system.

SUMMARY OF THE INVENTION

The present invention provides a modular signature and data capture device that employs a standardized ISA bus, standardized communication ports, standardized PCMCIA card input, and standardized ×86 CPU architecture. The use of such proven and standardized interfaces and CPU promote flexibility in using past, present, and future software and accessories. The device is intended for use at a point of transaction, e.g., when a user pays for goods purchased at a merchant store.

A VGA backlit LCD is superimposingly combined with a pressure touch pad that is useable with a passive stylus. The LCD can display pen-drawn signatures, and graphics in real-time, and can display images and data stored in the device, or downloaded from a host system, including advertisements and animation. The LCD can also display menus, device instructions, virtual pressure-sensitive data softkeys, and control softkeys. The device includes a built-in a three-stripe magnetic card reader unit and may include a built-in smart card reader. The device can accept PCMCIA-compatible accessories including solid state memory units and smart cards. The device is connector-compatible with modular accessories including an external PIN keypad entry unit, and a fingerprint unit. An omnibus add-on accessory unit combines a fingerprint reader, a smart card reader, a check processor, and a printer.

The omnibus unit permits an essentially paperless transaction to be conducted, in which a user's check is processed in realtime by the omnibus unit and device and is immediately returned to the user as a receipt for payment of the present transaction. The transaction is completed instantly in that the device contacts the user's bank and, if funds are available, debits the account as payment for the instant transaction. In this manner, the present invention facilities immediate payment to the merchant, and minimizes paper-work all around.

Transaction security is provided by DES-encrypting PIN data and/or using Master/Session or so-called DUKPT (for derived unique key per transaction) key management, and by causing data stored within the unit to be erased if tampering of the unit occurs. In another embodiment, a numerical token representing a sampled portion of a user's fingerprint is stored for use as a PIN in a magnetic card or a smart card carried by the user. At the point of transaction, the user's card is examined by the present invention, and the PIN token is noted. The device is then used to capture the user's fingerprint and to calculate a token for this fingerprint. The PIN token and this calculated token are then compared by the device. If the device confirms a token match, the transaction completes. Otherwise the transaction is aborted and the store merchant is alerted by the device that the card may be stolen.

The device may be used interactively at the point of transaction, for example to display advertisements on the LCD screen that are relevant to the user's purchases, or to print out relevant discount coupons. The device enables the merchant to create a profile for each user, and may be used to communicate purchase information to the user's own computer, e.g., via an internet link, for user accounting purposes.

Other features and advantages of the invention will appear from the following description in which the preferred embodiments have been set forth in detail, in conjunction with the accompanying drawings.

DETAILED DESCRIPTION OF THE PREFERRED EMBODIMENT

Figure 1:
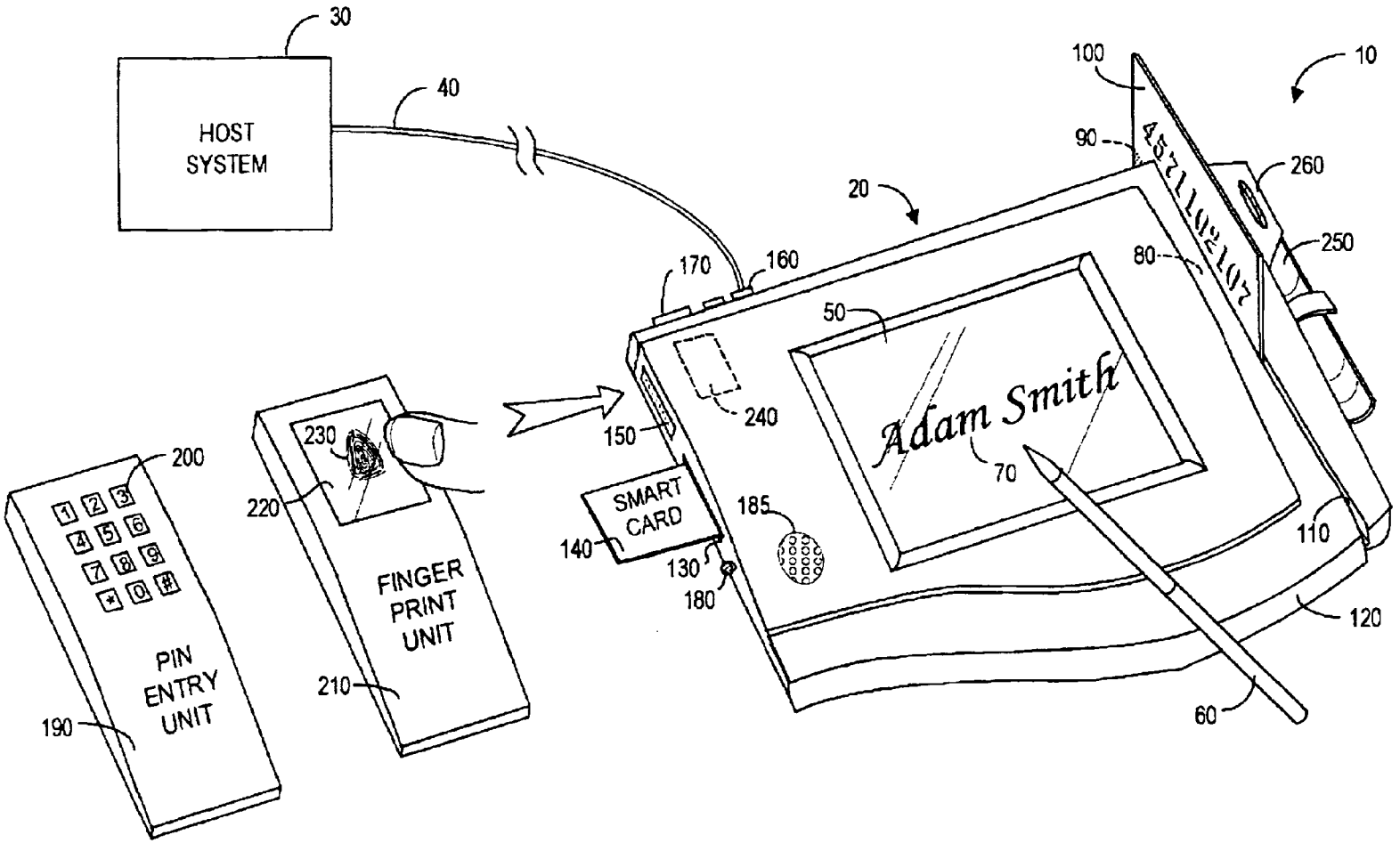
FIG. 1 depicts a signature pad device with exemplary add-on options, according to the present invention.

FIG. 1 depicts a generic system 10 that includes a signature pad device 20 that preferably is coupleable to a host system 30 via a communications link 40 that may include a telephone line, a network or internet linkage, wireless linkage including satellite linkage, among other modes of information transfer. Host 30 may be a dumb terminal, an electronic cash register, a sophisticated centralized networked server, or other piece of equipment. Although FIG. 1 shows a single device 20 coupled to host 30, in practice, many devices 20 may be coupled to a common host, and/or may be daisy-chained to one another. As will be described, device 20 has software capabilities that permit host 30 to download not only commands and status signals, but applications and forms as well.

Device 20 includes a pressure sensitive screen and display unit 50 that can respond to pressure from a passive stylus or pen 60. As will be described later, unit 50 combines and superimposes a pressure sensitive pad 50A and as a liquid crystal display ("LCD") 50B into a single unit (see FIG. 2). A user can write a signature 70 on unit 50 using stylus 60, and simultaneously see the as-written signature displayed on unit 50. Of course, sketches and other graphics may be user-drawn on unit 50. Unit 50 can also display menus, commands, graphics, and other information from a processor unit within unit 20, or using data from the host system.

Unit 20 also can communicate input data and/or output data from other than screen 50. Unit 20 preferably includes a magnetic card reader ("MCR") 80 that can read/write data from as many as three magnetic stripes 90 borne on a credit card or other substrate 100. The credit card 100 is hand-slid through a slit-like channel 110 in the housing 120 of unit 20, and magnetically stored information may be read from or written to stripes 90.

Unit 20 preferably includes at least one accessory slot 130 through which an accessory card 140 can be electronically coupled to unit 20. Card 140 preferably has an industry-wide interface, e.g., PCMCIA type II, and may be a so-called smart card that internally stores user identification data as well as a monetary value of the card. As such, the card may be used as a debit card. Device 20 exhibits high degree of security when used with a smart card 140 in that the card internally stores the correct personal identify number ("PIN") for the card owner. When using device 20 and a debit smart card, a user must manually enter PIN data that matches the true data pre-stored in the debit smart card. If a PIN match results, a transaction can go forth if the monetary value of the card is not exceeded. Of course, other accessory cards 140 complying with the internal interface standard may also be used. Further, PCMCIA compatibility permits the preferred embodiment to function with many PCMCIA type II solid state memory units among other accessories.

Unit 20 also provides several input/output ports e.g., 150, 160, 170 through which still other units and accessories may be accessed. Of course a greater or less number of such ports could be provided. Host system 30 for example is accessed via port 160, preferably a serial RJ45 or a DB9 communication port. Preferably such ports can carry synchronous or asynchronous data at rates at least up to 19.2 Kbaud. An infra-red transmitter/receiver light emitting diode ("LED") 180 preferably is also included to permit IR wireless communication between unit 20 and other devices, a printer for example. A transducer 185 such as a loudspeaker is provided to provide audio signal confirmation to the user with respect to entry of data, device status, and so on.

At least one port, e.g., port 150, is disposed to provide the option of allowing accessory units to plug-into and be physically attached to unit 20. Such plug-in and attachment is depicted in FIG. 1 by the large arrow point toward port connector 150. Of course accessory units whose form factor did not readily permit such attachment could still be used. Such units would be electrically coupled to unit 20 via a cable terminating in a connector appropriate to mate to the connector associated with port 150, or other port(s) associated with device 20.

One accessory unit 190 might include a key pad 200 to allow a user to enter data into unit 20, including for example a personal identification number ("PIN"). In the configuration of FIG. 1, a connector (not shown) on the righthand side of unit 190 would be disposed so as to matingly engage connector 150 on unit 20 such that electrical and mechanical couplings results. Another accessory might be a fingerprint unit 210 that could include a screen 220 against which a user's thumb (or other finger) is pressed to make a print 230. Software within unit 210 and/or unit 20 could signal process a portion of the resultant fingerprint data for transmission to host system 30. Host system 30 can compare the just made fingerprint with previously stored fingerprint data for the user and provide absolute confirmation that the user is who the user purports to be. Of course unit 210 could be implemented with a standalone computer and scanner unit, whose output data were coupled to unit 20 via an input port, e.g., port 150.

In the preferred embodiment, unit 20 is contained within a housing 120 that measures about 15 cm in width×20 cm in depth by 4 cm in height, and weighs about 630 g. The useable area of pressure pad/LCD screen 50 is about 7.6 cm×10.2 cm. FIG. 1 is intended to depict a preferred form factor, and it is understood that other form factors having other dimensions and weights could be used instead. Housing 120 preferably is made of an injection-molded plastic resin, and is ergonomically designed to accommodate right and left handed users.

Preferably unit 20 is powered by a battery 240, e.g., 12 VDC, although an internal AC-to-DC power supply could also be used. As shown in FIG. 1, unit 20 includes a holder 250 for storing stylus 60 when it is not be used, and also includes a member 260 that permits securing unit 20 to a desk or counter to prevent its unauthorized removal. Holder 250 may also be used with a cord or the like to secure stylus 60 to unit 20.

Figure 2:
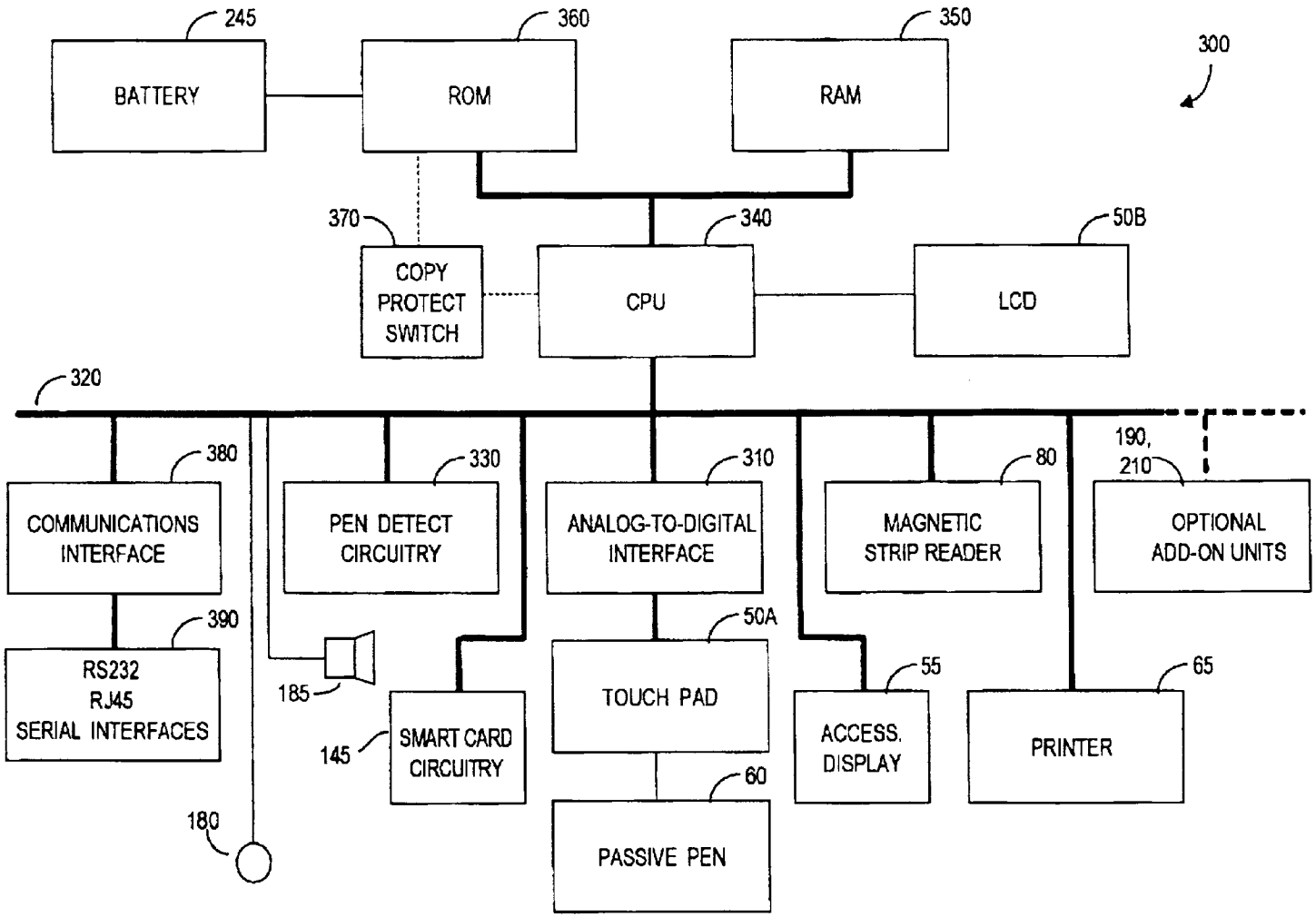
FIG. 2 is a block diagram of a signature pad device and plug-in accessories, according to the present invention.

FIG. 2 is a block diagram depicting the preferred architecture 100 for unit 20, although other architectures might be utilized instead. Reference numerals in FIG. 2 that are the same as numerals used in FIG. 1 can refer to the same unit or sub-unit. Note that what in FIG. 1 was denoted as pressure pad/LCD unit 50 is shown in FIG. 2 as touch pad 50A and LCD 50B. In terms of signal processing, signals associated with units 50A and 50B may be handled differently, however from a user's perspective, these two units appear to function as a single module 50. Details as to design and fabrication of unit 50 are known in the art, and are not here presented. As implemented, architecture system 300 is designed to be backward compatible with many existing signature capture devices, for example the older PenWare model 2000 unit, and to be compatible with the command set used in such earlier devices.

Touch or pressure pad 50A preferably provides 4096×4096 pixel resolution and acts as a writing surface upon which a user may draw or write (e.g., a signature, a sketch, a doodle), preferably with passive pen 60. By passive it is meant that pen 60 may simply be a plastic or wooden pointed stick. In contrast to many prior art approaches, pen 60 need not emit or sense IR, or carry a magnet. As such, pen 60 and touch pad 50A are relatively robust and inexpensive to produce.

As a user writes upon the surface of touch pad 50A, pressure sensitive sensors within the pad respond to user-drawn positions of pen 60. In practice, the 4096×4096 pixels used in the preferred embodiment are adequate to permit signature verification. Of course, other resolution pads could be used.

Preferably LCD 50B is backlit and displays signature and images drawn by user on touchpad 50A. Further, LCD 50B can display forms, graphics controls, and generally permits unit 20 to act as a full featured transaction terminal. (For example, in FIG. 3, a menu 400 including instructions 410, softkeys 420 and command key 430 is shown on LCD 50.) In the preferred embodiment, LCD 50B provides VGA 320×240 pixel resolution and includes a zooming engine. (It will be seen that the data capture resolution of pad 50A exceeds resolution of LCD 50B.) In the preferred embodiment, LCD 50B provides sufficient resolution and contrast to comply with the low vision requirements of the Americans with Disabilities Act (ADA).

An analog-to-digital (A/D) interface 310 converts the analog pen position to the high resolution x-axis, y-axis coordinates of touch pad 50A. Pen-drawn pressure coordinates may be communicated in raw format to host system 30, or may be signal compressed and buffered within unit 20 and then transmitted to host system 30.

Architecture 300 includes a preferably industry standard architecture ("ISA") bus 320, which is drawn with bold lines in FIG. 2. Bus 320 is used by the A/D interface unit and other units to couple information within unit 20. For example, pen detection circuitry 330 receives, via bus 320, A/D pressure pad coordinate data from unit 310, and thus can detect what the user has drawn upon touch pad 50. Display data for LCD 50B is output directly by CPU 340.

In the preferred embodiment, system 300 operates under control of an embedded microprocessor (CPU) 340, e.g., an x86-compatible processor operating at 16 MHz clock frequency. The use of industry standard x86 architecture and an ISA bus permits unit 20 to readily accommodate future expansion, for example via PCMCIA type II memory cards and the like. Further, such standard architecture facilitates ease of software programming and permits use of readily available, low cost tooling programs. For example, system architecture 300 is sufficiently flexible to permit a software developer to custom write applications for touch pad 50A, and also to use a personal communications system to send commands and receive information bytes from the pad. The preferred embodiment provides support for MS DOS/Windows 95, Windows 3.1 and Windows NT platforms.

In FIG. 2, read only memory (ROM) 360, preferably is a 256 KB EPROM unit, stores firmware used to control CPU 340, which firmware implements a command set for operating unit 20. The firmware preferably supervises processing a signature or other writing 70 drawn on touchpad 50. The firmware also preferably encrypts a user's personal identification number (PIN), provides on-the-fly data compression, and can control operation of any peripheral or optional attachments coupled to unit 20, by way of example, units 190, 210.

Volatile random access memory (RAM) 350, preferably 256 KB, provides in-system memory to maintain data including encryption key, custom stored signature, customized logos to be displayed on LCD 50B. RAM 350 may also store compressed multiple complete signatures for transmission to host 40 upon request. Communications between CPU 340, RAM 360 and RAM 350 are via ISA bus 320. RAM 350 is backed-up by battery pack 245 to preserve such data during interruptions to the system main power supply 240.

A copy protection switch unit 370 can provide a security feature that enables CPU 340 to protect encryption key data and to erase such data automatically if an attempt is made to open the case of unit 10. Attempts to tamper with device 20 will thus preferably result in automatic erasure of data, to promote data security. Such encryption and copy protection features help ensure the security of transactions made using device 20.

Preferably serial communications interfaces 380 and 390 couple serial port connectors, e.g., 160, to ISA bus 320 using standard serial communications protocols. In the preferred embodiment, one RS-232 serial connector 170 and two RJ-45 connectors 160 are provided. The serial connectors may be used to provide communication between unit 20 and a host system 30. Host system 30 may of course provide a full server-type computer system and will typically be located off-site from the point of transaction whereat unit 20 is used.

As noted, system 20 includes a built-in magnetic stripe reader (MSR) 80 that enables identification and other data encoded magnetically on cards 90 to be read as the card is slid through guide channel 110. The ROM-held command set preferably enables unit 20 to provide read operations for reading two or three track magnetic debit or credit cards 100, to help promote secure transactions.

Further, CPU 340 and ROM 360 provide for reading and encrypting personal information number (PIN) data entered into unit 20, e.g., from a PIN pad accessory unit 190. In general, data entered using handwriting 70, data keys 200, touch data (e.g., pressing on LCD 50 to select a displayed menu option) among other user responses may also be recognized by CpU 240. Unit 20 preferable includes an audio transducer 185 to provide audible feedback to confirm successful entry of PIN data, magnetically encoded data, and the like.

Figure 4:
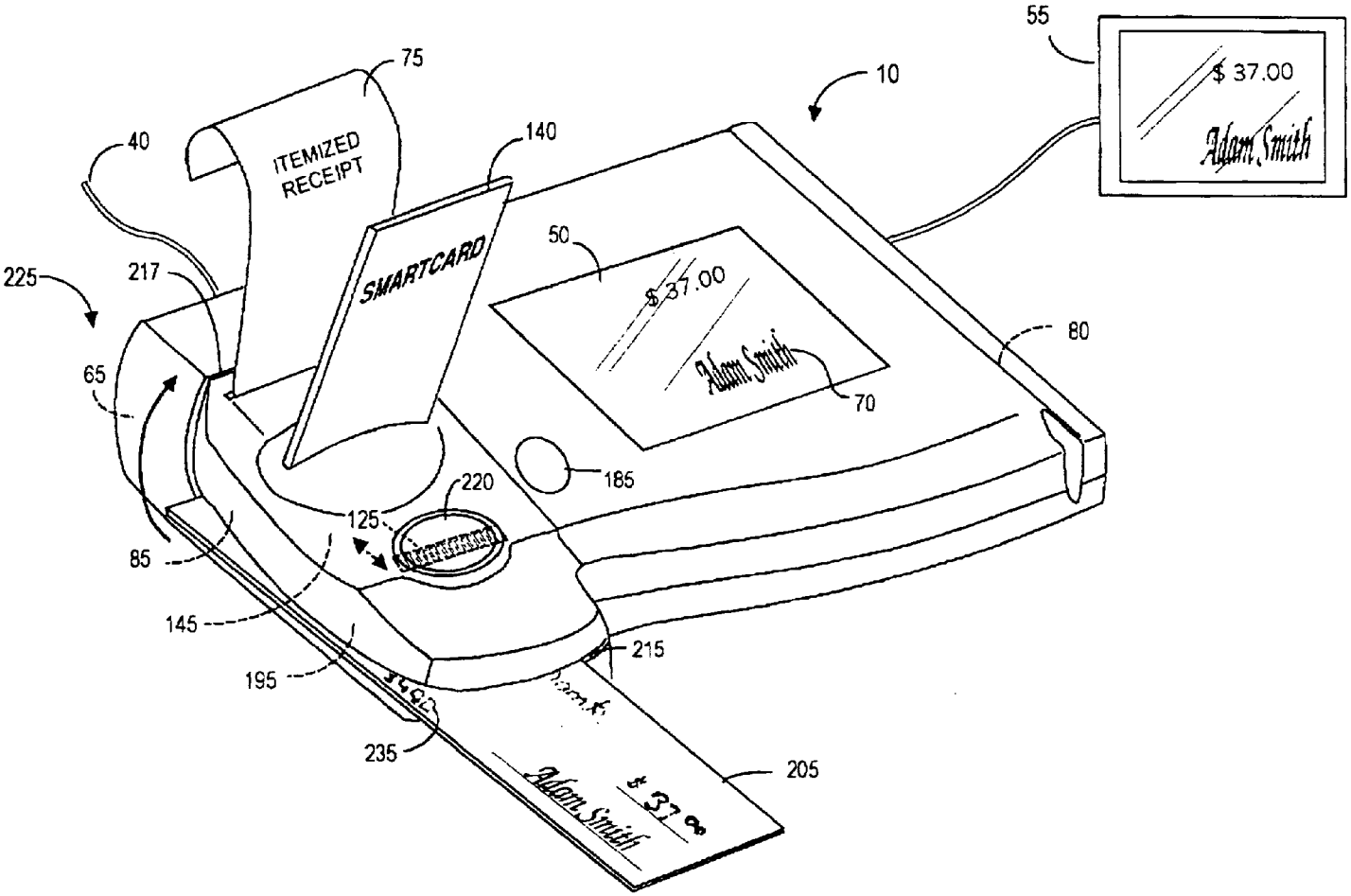
FIG. 4 depicts a signature pad device and omnibus plug-in accessory, according to the present invention.
Figure 5:
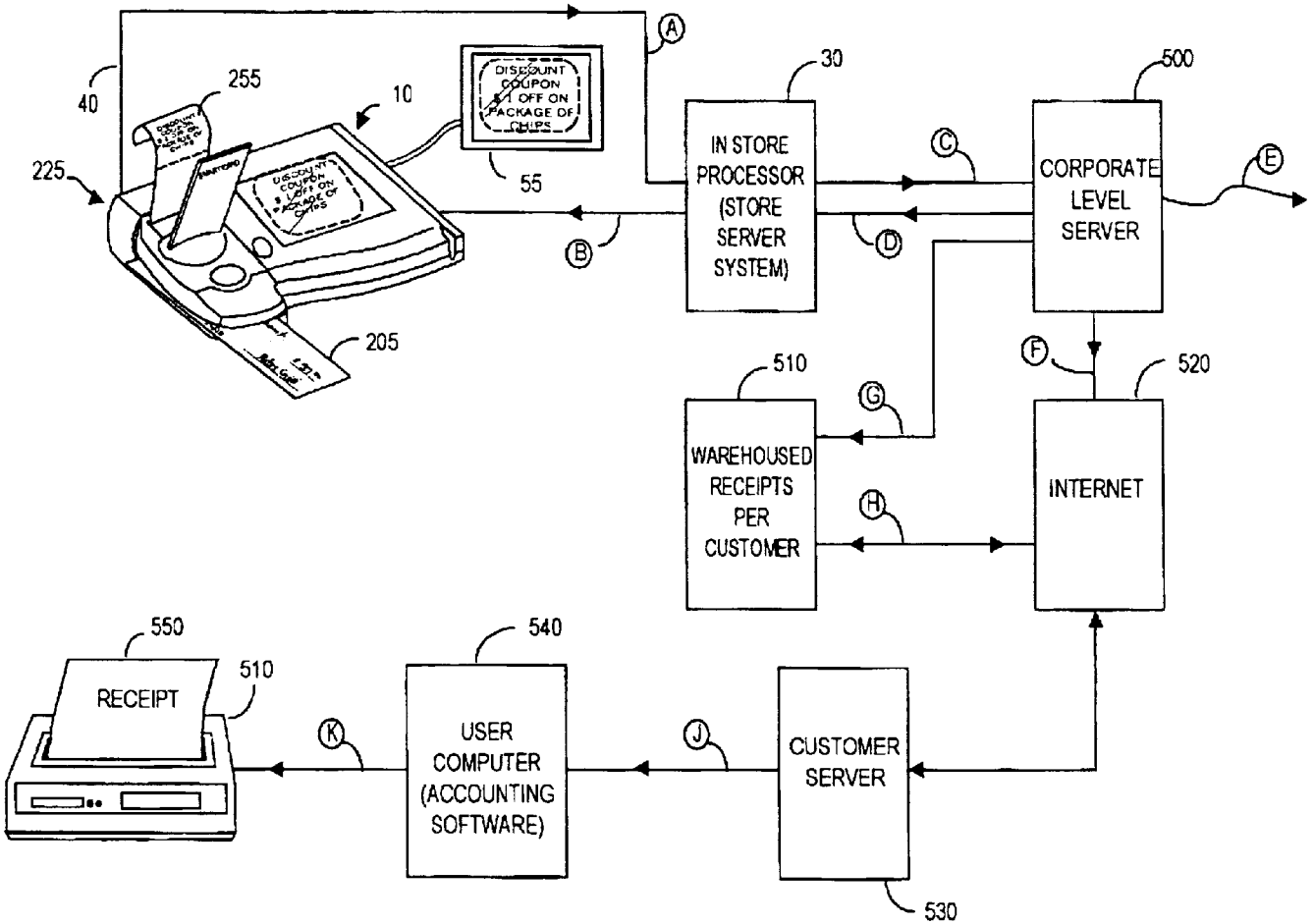
FIG. 5 is a block diagram depicting additional services and functions provided by the present invention.

Optionally, unit 10 includes a port and electronics to accommodate a second and preferably LCD display 65 (see FIG. 5). When unit 10 is used at a point of transaction, the check-out counter of a store for example, second display 65 is mounted for easy viewing by the cashier. Display 65 replicates what is shown on display 50, and enables a check-out cashier to confirm, for example, that the consumer-user has written his or her signature. Smart card circuitry 145 may also be included within unit 10, or may be included within an add-on unit such as unit 225 (see FIG. 4).

Device 20 preferably is implemented using application specific integrated circuits ("ASICs") to provide a low integrated circuit ("IC") chip count, to provide high reliability and to decrease fabrication costs. For example, the present invention, with its passive pen technology can maintain nearly 43,000 hours MTBF.

Consider now the nature of hardware and software operations with device 20. At a relatively unsophisticated level of operation, host 30 (e.g. a cash register or terminal) controls device 20 by issuing it various commands and then interpreting responses from device 20. Host 30 may signal device 20 that it is ready to accept signature data. Device 20 may then send signature data to host 30 in real-time or as blocks of compressed data.

In the preferred embodiment, all communications are interrupt driven to insure a timely response without missing data. Alternatively, a software development toolkit is available from assignee PenWare, Inc. for 16-bit DOS, Windows 3.x and Windows 95, 32-bit Windows NT and OS/2 platforms. Toolkit library routines encapsulate details concerning touch pad-host communication, permitting application developers to focus on applications without undue concern for underlying details. Toolkit services range from libraries for traditional C/C++ environments to VBX and OCS controls for rapid program development environments such as Visual Basic and report generators. The PenWare software user's Reference Manuals for the PenWare 2000 and 3000 are referred to for further application development information, and is incorporated herein by reference to the extent necessary.

A SigBox tool provides component software, OCX (OLE) links, and visual basic (VBX) functions. A SigKit processes signatures, encrypts, sales, converts, and can provide data in various formats including *.BMP, *.TIF, *.PCL, *.WMF, as well as providing *.DLL and C/C++ functions. A PadCom toolkit provides low level communications to the pressure pad, including attachments thereto.

As explained more fully in the above-cited Reference Manuals, when device 20 is powered-on, a message is displayed on LCD 50 for a few seconds. During this interval the user can cause a setup menu to be displayed by touching LCD 50B. The setup menu allows personalizing settings such as mode of operation, LCD brightness, audio control, etc., and also permits calibrating the touch pad. When exiting the setup menu (or if the LCD screen is not touched during the power-up cycle), the unit displays a logo and is ready for communication with the host.

As noted, unit 20 is controlled by host 30, which sends unit 20 one or more binary commands. Some of these commands will cause data values to be returned by unit 20 to the host via linkage 40 (which may in fact be wireless). In the preferred embodiment, each issued host-command includes a 16-bit opcode followed by a 16-bit argument length, followed by optional argument data. Command results do not have an opcode or argument length fields, and consist of a stream of result arguments, All 16-bit values are ordered as low byte followed by high byte.

Each command sent from the host (or terminal) to the pad consists of 16-bit opcode followed by 16-bit arguments length, followed by optional argument data. The format is as follows:

| opcode | arguments length | (optional) arguments data field |
|---|---|---|

The arguments length specifies the total length of the arguments in the argument data field. If the command does not have any argument data, the argument length value is set to zero, and the argument field is omitted.

If the argument field exists, it may have one or more arguments, which may be fixed-length of variable=length. Fixed-length arguments have a size determined by the type of argument. The size of variable-length arguments is specified by a 16-bit argument length sub-field, follow by the actual argument data.

| argument data field | | | |
|---|---|---|---|
| len1 | arg1 | arg2 | arg3 |

If the argument field exists, the field may consist of one or more arguments. Each argument is either fixed length or variable-length. The size of each fixed-length argument is determined by its type. The size of each variable-length argument is specified by a 16-bit argument length sub-field followed by the actual argument data. In the command format shown immediately above, three arguments are present. The first argument (arg1) is variable-length with the length being specified by the preceding field (len1). The two remaining fields (arg2, arg3) are each fixed-length arguments.

The format of data received by the host is a stream of result arguments, there being no opcode or arguments length fields. Similar to what was described for the host send command format, each result argument is fixed-length (the length being type-determined) or variable-length (the variable-length argument being specified by a 16-bit argument length sub-field preceding the actual argument data. Format of 16-bit values is low byte/high byte, that is for a 16-bit value, the low byte precedes the high byte.

By way of example, consider a command having no argument. (All of the following examples may be tested using VIEWCOMM operating under MS-DOS). If it were desired to send a command clear the LCD screen, the following hexa-decimal byte stream would be issued:

$40$32$00$00

The above byte stream may be viewed as follows:

| opcode | arguments length |
|---|---|
| $40$32 | $OO$OO |

The first byte $40 is command opcode low byte, and the second byte $32 is the high byte. Together these two bytes comprise the full 16-bit opcode value of $3240, which is the command Display_Clear. The next byte is the arguments length parameter low byte value, for which last byte is the high byte. Since no arguments are present in this example, the arguments length value is equal to $0000, which arguments length value should always be included even when sending no arguments. After executing this command, the LCD screen will be cleared, and there is nothing to be returned to the host computer.

Consider now an example of a command that requires four fixed length argument bytes of the AREA type. Suppose it is desired to draw a solid box on the LCD screen, starting at the horizontal column position $20 and vertical row position of $10, using a size $30 horizontal columns by $40 vertical rows. Drawing such box would result from sending the following stream of bytes:

$51$32$08$002

The byte stream may be viewed in a more simplified fashion as shown below:

| opcode | arguments length | arguments data field |
|---|---|---|
| $51$32 | $08$00 | $20$00$10$00$30$00$40$00 |

In the above depiction, the first two bytes represent the opcode in the low byte/high byte format. Collectively these two bytes comprise the 16-bit value $3251, which is the command Display_Box. The second two bytes represent the arguments length, here equal to $0008, since a total of 8 bytes follow in the argument data field.

The arguments data field contains the following information:

| argument data field | | | |
|---|---|---|---|
| POINT data type | | VAR data type | |
| column | row | length | bytes |
| $08$00 | $10$00 | $05$00 | HELLO |

The first two bytes represent the horizontal column position and the vertical row position, whereat drawing the box should begin. The third two bytes represent the horizontal column size to use when drawing the box, and the fourth two bytes represent the vertical row size to use when drawing the box. After executing this command, there is nothing to be returned from the pad to the host computer.

Consider now a more complex example of a command that requires both fixed length arguments (POINT data type) and one variable-length argument (VAR data type). If it is desired to display the text message "HELLO" at LCD screen horizontal column of $0008 and vertical row $0010, the following stream of bytes would be sent:

$80$32$0B$00$08$00$10$00$05$00HELLO

Again, to simplify this example one can view the bytes as follows:

| opcode | arguments length | arguments data field |
|---|---|---|
| $80$32 | $0B$00 | $08$00$10$00$05$00HELLO |

The arguments length value equals $000B in hexadecimal (11 in decimal) because the arguments length value is equal to the full length of all of the arguments in bytes. The argument data field in this example contains 11 total bytes, and the arguments length field must always equal the exact amount of bytes to follow in the argument data field.

Consider now the argument field, which may be represented as follows:

| argument data field | | | |
|---|---|---|---|
| POINT data type | | VAR data type | |
| column | row | length | bytes |
| $08$00 | $10$00 | $05$00 | HELLO |

The first set of bytes is the low byte, high byte horizonal column position, and the second set of bytes is the low byte, high byte vertical row position. The next set of bytes is the length of the variable-length data that is to follow, here the five-byte character string "HELLO". The next five bytes represent the character string to be displayed, here "HELLO".

The present invention can also handle bitmaps, for example an image drawn with passive pen 60 upon the touch screen 50A. In a bitmap, an image is represented digitally such that each pixel in the image corresponds to one or more bits in the bitmap. The VAR bits are a pointer to a buffer that holds byte-aligned bitmap bits to be stored as an array of byte values. As implemented, the VAR bits are used in command $2050 Mem_LoadBitmap, $3290 Display_Bitmap, and $32F4 Display_SetLogo. To avoid conflict, bitmap bits should not include Windows BITMAPINFO-HEADER or color table.

Device 20 may be configured to capture and transmit signature data to the host as soon as available, e.g., in real-time. Alternatively, signature data can be captured and stored or buffered within unit 20 for later transmission to the host. A Pad_Record command, or a Pad_RecordBuf command is used to start a signature capture session. As it is being written on touch pad 50A, the signature is displayed on LCD 50B. The signature will remain displayed until a Pad_Reset command is received from the host. The host application will determine when to terminate the signature signing session.

Such termination can be accomplished by host-setting a predetermined time for signing, by viewing the signature, or by a completion indication from the signing user. The completion indication may be entered using a virtual (e.g., LCD-displayed) control key such as softkey 430 shown in FIG. 3. The user's pressing LCD 50 in the area of control key 430 (or the equivalent) causes a Pad_Stop or Pad StopBuf command to issue, which ends a signature signing session.

Signature real-time and buffered captured modes will now be described. Real-time signature capture x-axis, y-axis coordinates and pen status data can be sent to the host as soon as they are available. When the Pad_Record command is sent from the host to device 20, device 20 responds by sending the signature data in real-time to the host. Preferably, the format of this real-time data is a uncompressed vector contained in five byte packet, although other formats could be used. Issuance of the Pad_Stop command terminates real-time signature capture mode.

In buffered signature capture mode, signatures can be stored in internal RAM 350 within device 20, for uploading to the host when requested. Procedurally, a Pad_RecordBuf command is first issued by the host to initiate a buffered capture mode. Device 20 then captures and stores all pen strokes on touch pad 50A to an internal buffer (which may be associated with RAM 350), while simultaneously displaying the pen strokes on LCD 50B. At the end of signature signing session, the host issues a Pad_StopBuf command to terminate capture. The host then requests transmission of the buffered signature by sending a Pad_GetBuf command to device 20. Device 20 then sends the signature data in compressed format to the host. In the preferred embodiment, the device buffer may retain up to 100 signatures at a time, although larger or smaller storage capacity may be implemented.

Assume that device 20 is to read magnetically encoded information (using MSR unit 80) in one or more stripes 90 on a card 100, as shown in FIG. 1. The host issues a Card_GetTrack command followed by the track number, e.g., track 0, 1 or 2 in the preferred embodiment. Device 20 will then return the track data read from card 100, if available. A Card_Reset command is then used to purge track storage buffers within device 20, e.g., associated with RAM 350, such that a new card 100 may be read.

Figure 3:
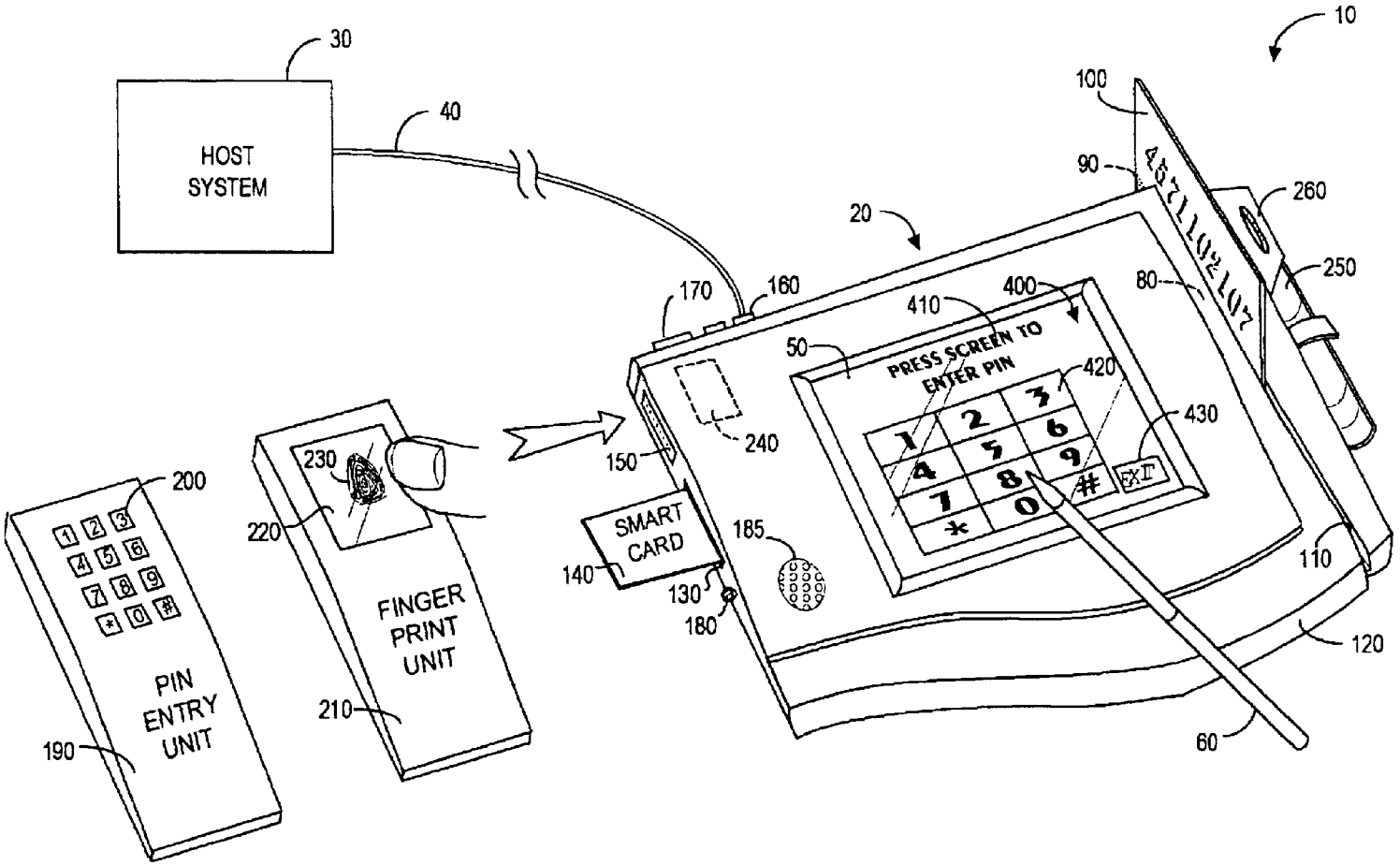
FIG. 3 depicts a signature pad whose display shows a menu and virtual keys for user entry of data, according to the present invention.

As noted with respect to FIG. 1 and FIG. 3, device 20 may be used with a PIN pad unit 190. Alternatively, LCD 50B may be caused to display soft-keys that the user can touch to key-in PIN and other numeric data. In either event, the user is prompted to enter a PIN number, typically in conjunction with a debit transactions.

In FIG. 3, for example, LCD 50 presents the user with a menu display 400 that includes instructions 410, a virtual keypad 420, and one or more soft control keys 430. If the user wishes to input a PIN that is, for example, 3642, the user presses the soft "3" key, the soft "6" key, the soft "4" key and the soft "2" key displayed on the LCD. As the target areas to be pressed are relatively large, the user may press the softkeys with a finger or with pen 60.

Audible feedback from transducer 185 can provide the user with appropriate confirmatory entry response. Such response might be a simple audible "beep" or in a more sophisticated implementation, transducer 185 could emit the spoken word corresponding to each softkey digit as the key is pressed. Circuitry and techniques directed to computer-generation of spoken words corresponding to digital entries are well known in the art, and will not be described further herein.

The host system activates PIN pad 200 on an accessory unit 190, or a virtual PIN pad 420 on LCD 50 by issuing a Prompt_PIN command. When a user enters a PIN and presses an ENTER key (e.g., the "#" key), the PIN is encrypted and sent to the host. Device to host transmission preferably uses a ANSI X9.8 PIN block format. A valid PIN will contain between four and twelve digits, and the host will return an error message if the PIN is invalid. The returned message may be displayed on LCD 50 and/or audibly sounded via transducer 185. If a printer is coupled to device 20 (e.g., by cable or by IR) the return error message may be printed.

To promote transaction security, all PINs are preferably data encryption standard ("DES") FIPS PUB 46, 1977 encrypted using DUKPT (ANSI X9.24) or Master/Session key management. Before using the hardware or the virtual PIN pad, the user is asked to input a initial encryption key and serial number into device 20 in a secure environment. In the preferred embodiment, the DUKPT key management system derives a new key for each PIN encryption, and can derive more than one million keys. In a so-called Master/Session procedure, a master key is injected into the pad in a secure environment, and thereafter, new session keys, encrypted by the Master Key, can be sent to the pad. Device 20 preferably uses the master key to decipher the new transaction key, which is then used to encrypt user PIN data sent to the host.

To promote security, preferably the initial key can never be read back from the device, and is automatically deleted if there is an attempt to tamper with the device. The initial key is stored in battery backed 350.

While the present invention accommodates use of PIN-security, PIN numbers may be lost or compromised, for example, the user may inadvertently misplace a paper containing the PIN numbers. The present invention preferably provides the ability to use fingerprint identification from the user as a form of PIN identification. In addition to or as an alternative to the use of fingerprints described earlier herein, a preferred embodiment scans a fingerprint 230, which is to say, scans the user's fingerprint, pressed against surface 220. To reduce manufacturing cost and product weight, scanning may be accomplished using a miniature linear charge coupled scanning device ("CCD"), of the general sort as are found in FAX machines. Such a device is shown in phantom as element 125 in FIG. 4, and is mechanically moved (as shown by the accompanying double arrow) to scan the image of a finger pressed against region 220. Such a CCD element typically is about 1" (2.54 cm) in length and includes perhaps 300 elements, providing 300 dpi scan resolution, E. G. & G. Reticon Co. of Sunnyvale, Calif. is one manufacturer of such devices.

Rather than store the totality of fingerprint data, it is possible to electronically examine, within a unit 210 (FIG. 1) or a unit 225 (FIG. 4) a portion of the total fingerprint. An algorithm is executed by CPU 340 to represent this minimal fingerprint data as a digital token, or number, which may be used as a fingerprint PIN. This PIN number may be electronically stored, for example on a magnetic strip 90 associated with a card 100, or stored within an IC contained in a smart card 140. It is in fact possible to generate a substantially unique PIN token for a given fingerprint and store the token within less than about 60 bytes of data.

A system 10 equipped with a fingerprint accessory unit 210 or 225 or the like is used as follows. Either before or during the transaction, the user presses his or her fingerprint against surface 220, whereupon a token is generated in real-time corresponding to the fingerprint. This token is then compared against fingerprint PIN token information stored in the user's card 100 or card 140. If the tokens agree (as determined by electronics within unit 10), the user is the owner of card 100 or 140, and the transaction may go forth. If the tokens do not agree, absent an error in generating one of the tokens, the user is not the owner of card 100 or 140. Under these circumstances, the transaction should not be completed, absent other positive identification to the reasonable satisfaction of the merchant at the point of transaction.

In this fashion, the user need not memorize a PIN to secure transactions, and indeed if card 100 or 140 were lost or stolen, the resultant token mismatch when the card(s) were attempted to be used would bar the transaction from completion. Indeed, since users would not know how system 10 functions, it is likely that a thief would not risk introducing what appears to be fingerprint identification into the merchant's computer system, and would simply not use card 100 or 140.

Further details as to the internal display operation of device 10 will now be given. Device 20 displays graphic and text information, including advertisements, on its integrated high contrast backlit LCD pixel graphic display 50 in the following manner. To display data at any time, the host issues a command such as Display_Text. If desired, the host can download a bitmap image for input into battery backed RAM 350 for immediate display on LCD 50 when device 20 powers-up. Such image may also be displayed programmatically at any time by issuing a Display_Logo command. The image may be a custom logo to help the user identify the application. The image may also present a helpful message to the user. The preferred embodiment provides two displayable text fonts: a small 8 pixel×8 pixel font and a larger 16 pixel×16 pixel font. Text, graphics, and pen strokes can be displayed on LCD 50 simultaneously.

Optional add-on unit 225 in FIG. 4 is an omnibus unit that includes a fingerprint identification unit 220 (and associated electronics), electronics 145 for reading a smartcard 140, an internal printer 65 for printing indicia such as an itemized receipt 75, and electronics 195 for reading and processing a user's check 205. Of course unit 225 could include fewer than all of these features, or could include still additional features.

The operation of the check processing function of unit 225 will now be described. As shown in FIG. 4, check 205 is inserted into slot 215 within unit 225, and is moved up and through the unit in the direction shown by the curved arrow. Electronics 195 magnetically reads characters 235 imprinted on the check, which characters identify the user's bank and bank account number. Communications link 40 enables unit 10 to communicate in substantially realtime with the user's identified bank to confirm there are sufficient account funds to negotiate the transaction at hand. (By substantially realtime it is mean that if communications does not occur within seconds, any time delay will be less than perhaps a minute or so.) If not, display 50 can signal the check-out cashier appropriately, for example through an auxiliary display unit 55, and/or speaker 185 can emit an audible warning.

In practice, the consumer purchaser would sign check 205 and insert the otherwise blank check into slot 215 in unit 225. Alternatively, the customer need not sign the check, but would write a signature on screen 50. System 10 knows the merchant store identification and the dollar amount to be charged from host information available via link 40, and knows the user's bank and account number from indicia 235 on the check. Assuming that information transmitted via link 40 to a clearing house for the user's bank confirms available funds to complete the present transaction, printer 85 will then print the date, the dollar amount, and the merchant store as payee on check 205. Printer 85 can also print the customer's signature 70 on the check, and legally "VOID" the check, e.g., by printing "VOID" thereon. Processed check 205 will then emerge from the exit portion 217 of the continuation of slot 205, but near the rear portion of device 225, as shown in FIG. 4. If desired, other documents 75 printed by printer 85 may also emerge from the same exit slot portion 217 as a processed check 205.

The check-out cashier will then hand the check to the customer as a transaction receipt, as the funds have automatically been transferred from the identified bank account into the merchant's bank account. Of course, the customer may also be given a printed receipt 75 enumerating the items purchased and their cost. Security in the above transaction can of course be promoted if the merchant insists upon use of a credit card 100 or smartcard 140, whose memory includes for example either PIN or preferably fingerprint PIN token information. Such security will protect the user against misuse of lost or stolen checks.

It will be appreciated that the above-described use of system 10 permits instant transfer of funds, with minimal generation of paperwork. From the merchant's perspective, payment for the transaction occurs in realtime, and the transaction is memorialized electronically. From the standpoint of the user's bank, there is no paper check to be negotiated and mailed back to the user as the user already possesses the "voided" or "cancelled" check as a transaction receipt.

If the transaction has involved the user of card 100 or 140, e.g., to further identification and security, card-stored information may include the customer's internet address and customer accounting information, e.g., that the customer maintains a Quicken-compatible accounting database on a home computer. System 10 can, if desired, automatically couple data memorializing the instant transaction over link 40 to the customer-user's database, whereupon the database is updated to reflect a debit for the subject transaction. If, for example, the transaction (or a part thereof) represents a tax deduction to the user, the user can input such information using system 10, whereupon the updated user database will properly tag the deductible portion of the subject transaction. Note too that since the user's identity and itemized present purchases are known to the present invention, the present invention can facilitate creation and maintenance of a purchase profile for each user. Stored preferably within the merchant's computer system, such a profile may be used by the merchant to determine effectiveness of advertising, goods placement on shelves, and so forth, on a per customer basis.

FIG. 5 depicts operative steps for the above procedures, as well as the use of system 10 to provide instant advertisement and reward coupons to the customer user. Although FIG. 5 is described within the context of a merchant retail store operation, it will be appreciated that other working environments are also applicable.

In FIG. 5 at the upper left-hand corner, unit 10 (shown here with omnibus add-on unit 225) is coupled via link 40 (data path A) to a host unit 10, here a server system, perhaps present within a merchant retail store. As will be described, reward-type information will be coupled over data path B from host system (or in-store processor, ISP) 30 to unit 10. Unit 10 and (if present, accessory display 55) is preferably located at the check-out area of a retail store. As has been described, it is assumed at this juncture that the purchaser has self-identified using a smartcard or a credit-type card with magnetic strips, and is identified to system 10. Assume too that a cashier has rung-up the user transaction on a cash register (or the equivalent), and that the transaction is almost complete.

Among the information carried by data path A will be an itemized list of the user's purchases, for example, 2 bags of Brand X potato chips at $1.20/bag, 1 carton of Brand Y soda at $2.95, and so on. These line items comprising the transaction may be coupled via data path C to a corporate level server unit 500. Whereas the in store processor or store server system 30 can readily decrement the store inventory by the items being purchased, the corporate level server 500 can do likewise for this store, and other stores also coupled to server 500. Preferably the corporate level server will transmit via data path E the debit/credit information pertaining to the subject transaction to a central clearinghouse for settlement.

Stored within, or made accessible to corporate level server 500 and/or merchant level server 30 is a database list of store-carried items for which rewards or promotions are to be issued in realtime to the user at the point of sale. For example, Brand X potato chips may wish to offer the user an immediate discount coupon for another type of Brand X chips, or a chip dip, or the like. Brand Y soda may wish to offer a discount coupon for the purchase of ice cream, and so on. Other items purchased by the user may not be the subject of a reward promotion.

Merchant server system 30 and/or corporate level server 500 may generate and store a profile of the individual customer's purchases, and in fact some rewards may be associated with a pattern of purchases by a given customer. Perhaps a customer who routinely purchases beer will be offered a discount coupon for pretzels after the third such beer purchase. The profile information may also be useful to the merchant store in deciding how effective shelf placement of certain goods has been, or how effective advertising has been. The inclusion of system 10 permits uniquely identifying sales and sales patterns to specific customers, by name, and potentially by sex, by age, by residence, and so forth.

Data path D can communicate to the merchant server information to be presented immediately to the purchaser. Merchant server 30 couples this information along data path B to system 10. If the information is a coupon or the like, preferably the printer associated with unit 225 immediately prints-out the relevant discount coupon(s) 225, or other promotional information. If desired, the coupon(s) can also be displayed. It is understood that data paths A and B may in fact be coupled over a single bus of wires.

It will be appreciated that at the time the transaction is being completed, the merchant has the user's complete attention, if for no other reason than to ensure there is no inadvertent overcharge. Thus, data path B may advantageously carry advertisement type information into unit 10, for display. Such advertisement may be ads for products associated with the user's present purchases, e.g., perhaps a pretzel ad if beer is now being purchased. Using a history of past purchases by this user (such purchases being stored within system 30 and/or system 500), the ads may intelligently present information directed to the user. For example, if the user routinely purchases dietetic food, an ad for a new type of dietetic food carried by the merchant might be displayed, and so forth. Such ads may include video animation and/or sound.

As noted, in identifying himself or herself to unit 10, the user's identification card (smart or magnetic strip) may include the user's e-mail or internet address, and personal accounting software information. In a preferred embodiment, data path F couples information, optionally via the internet 520 or other communications link to the customer's server unit 530, perhaps located at the customer's home or business. Stored within the customer server may be a database of the customer's financial transactions, stored perhaps as part of a financial accounting software program 540. Drawing upon information made available from warehoused records 510 for this user, the merchant and corporate level servers can periodically update via data path H the user's server 530, such that financial software 540 is current on at least a weekly or monthly basis. Of course more frequent updates could also be provided. The user's printer 510 may then provide hard copies 550 of receipts and other records relevant to the transaction made using device 10.

It will be appreciated from the foregoing description that the present invention provides a flexible signature capture device whose architecture readily allows for present and future expansions. The use of standardized architecture, ports, and a built-in PCMCIA type II interface further promotes flexible expansion, and contributes to decreased fabrication and programming costs. The preferred hardware integration reduces IC chip count and improves price/performance attributes.

Modifications and variations may be made to the disclosed embodiments without departing from the subject and spirit of the invention as defined by the following claims.

What is claimed is:

1. A self-contained modular signature capture device that has functionality without a host system and is useable during a transaction by a user to provide user-profile information, comprising:

a writing/display unit including a pad responsive to writing thereon with a passive stylus, and including a liquid crystal display superimposed with said pad;

a central processor unit (CPU) coupled to read-only-memory (ROM) storing at least one software routine executable by said CPU for operating said device, and further coupled to random access memory (RAM), and to said writing/display unit;

[an ISA-compatible bus coupled to said CPU;]

[an ISA-compatible bus coupled to said CPU;]

*a bus;* electronic circuitry, coupled to said bus and responsive to said writing so as to present on said display an image of said writing readable by said user;

interface circuitry, coupled to said bus, to permit operatively coupling at least one add-on accessory to said device;

a magnetic card sub-unit, coupled to said bus, to permit magnetically reading and writing data to a card carrying at least two stripes of magnetic media; and communication interface circuitry, coupled to said bus, to permit coupling said device to a communications link for data transfer to an electronic system, said data including user-profile data;

wherein during said transaction transferred said data enables said electronic system to select, based upon at least a purchase made during said transaction and upon any said user-profile data previously stored for said user, for immediate display and viewing by said user media relevant to said user's user-profile.

2. The device of claim 1, wherein said ROM includes a routine providing at least one of (a) DES-encryption for PIN data input to said device by a user, (b) Master/Session key management, (d) DUKPT key management, and (d) erasure of data stored in said RAM upon detection of tampering with a housing enclosing said device.

3. The device of claim 1, further including electronics, coupled to said bus, enabling said display to display at least one of (a) a menu of user options for operating said device, (b) commands, (c) graphics, (d) a virtual keypad for user operation of said device, (f) a reproduction of an image drawn on said pressure pad, and (g) imagery including promotional data generated externally from said device and coupled via said communications link and via said communication interface circuitry.

4. The device of claim 1, further including, internal to said device, circuitry enabling said device to interface and function with a PCMCIA-compatible card.

5. The device of claim 1, wherein said CPU, said bus, and each of said circuitry are compatible to standardized x86 CPU architecture.

6. The device of claim 1, wherein said interface circuitry permits coupling said device to at least one add-on accessory selected from the group consisting of (a) a PIN entry unit, (b) a fingerprint unit that can examine at least a portion of a finger pressed against said accessory and cause to be generated a numerical token that is a *user*-PIN of said finger, (c) a printer for printing data provided to or generated by said device, (d) a smartcard reader for reading and writing data to a smartcard inserted into said accessory, and (f) a check processor that receives a check and can print thereon a user's signature previously written on said pad and can print thereon a dollar amount and payee information available to said device and that scan bank and user identification printed on said check.

7. A system useable at a point of transaction to memorialize a transaction, to facilitate realtime completion of said transaction, and enable instant presentation of viewable media targeted to a user of said system based upon a profile of said user compiled from information including past transaction purchases made by said user with said system, the system comprising:

a self-contained modular signature capture device, including:

a writing/display unit including a pad responsive to writing thereon with a passive stylus, and including a liquid crystal display superimposed with said pad;

a central processor unit (CPU) coupled to read-only-memory (ROM) storing at least one software executable by said CPU for operating said device, and further coupled to random access memory (RAM), and to said writing/display unit;

[an ISA-compatible] *a* bus coupled to said CPU;

electronic circuitry, coupled to said bus and responsive to said writing so as to present on said display an image of said writing, in which said writing appears to a user to result in said image;

interface circuitry, coupled to said bus, to permit operatively coupling at least one add-on accessory to said device;

at least one said add-on accessory, coupled to said interface circuitry;

a magnetic card sub-unit, coupled to said bus, to permit magnetically reading and writing data to a card carrying at least two stripes of magnetic media;

communication interface circuitry, coupled to said bus, to permit coupling said device to a communications link for data transfer to an electronic host system, said device being operable without being coupled to said electronic host system; and an electronic host system, associated with said point of transaction, coupled to said device via said communication interface circuitry such that a point of sale transaction itemized by said device may be entered into said host system via said communication interface circuitry, said host system using data received from said device and received from said system during past transactions to generate and store for said user a user profile that is updatable with each succeeding purchase by said user using said system;

wherein payment for said transaction is accomplished by a user inputting a user PIN into said device and writing a signature on said pad;

*one of* said device *and said electronic host system* comparing the user input PIN with a *previously stored* PIN and if there is substantial identity between [each said PIN said device] *said user input PIN and said previously stored PIN,* permitting said transaction to further proceed;

wherein during said transaction, transferred said data enables said host system to select from said user profile media for immediate presentation and display to said user.

8. The system of claim 7, wherein said accessory includes a fingerprint unit operating to generate a token fingerprint PIN in response to pressing of a finger of said user against said accessory, wherein said fingerprint PIN is said users input PIN; and wherein said PIN stored in said card is a token previously generated by said device in response to said user pressing said finger against said fingerprint unit, said device then storing said PIN in said card belonging to said user;

wherein said card is selected from a group consisting of (a) a magnetic card containing one stripe of magnetic media, (b) a magnetic card containing at least two stripes of magnetic media, and (c) a smartcard.

9. The system of claim 7, wherein said device causes a decrement to a user account identified on a said card in an amount due for said transaction.

10. The system of claim 7, wherein said fingerprint unit includes a linear CCD strip scanning element that mechanically scans at least a portion of said finger pressed against said fingerprint unit.

11. The system of claim 7, wherein said user input PIN is manually input to said device by a user using at least one mechanism selected from the group consisting of (a) a virtual PIN pad displayed on said display, and (b) a PIN pad in said accessory.

12. The system of claim 7, wherein said accessory includes a printer, and a check processor unit that mechanically receives into said accessory a bank check belonging to said user;

said check processor unit reading identification of said user, said user's bank and bank account number from magnetically linked indicia on said check, and coupling all such information to said device for coupling to said host system;

said user writing a user signature on said display, wherein said check processor unit can print on said check at least one of the following (a) said signature of said user, (b) a dollar amount for said transaction as determined by said host system, (c) payee for said transaction as determined by said host system, and (d) a legal notice that said check is now voided;

wherein upon being processed by said check processor unit, said check is a receipt for said user of said transaction.

13. The system of claim 7, wherein said host system communicates data identifying said user's bank and bank account number to a clearinghouse and receives substantially realtime confirmation that adequate funds presently are in said account to pay for said transaction;

wherein said host system causes said account to be debited substantially in realtime by an amount of said transaction, said amount being transferred substantially in realtime to an account of said payee.

14. The system of claim 7, wherein said purchase profile includes a profile useable to ascertain effectiveness of advertising and shelving displays of a product with respect to resultant sales to users of said product.

15. The system of claim 7, wherein said host system is coupleable to a database containing information as to items whose purchase is intended to create a user event;

wherein said user event is selected from the group consisting of (a) an advertisement presented on said display, (b) an animated sequence of video presented on said display, (c) product information presented on said display, (d) a product discount coupon printed by a printer, (c) a product discount coupon printed by a printer in said accessory.

16. The system of claim 7, wherein said host system electronically communicates an accounting record of said transaction to a database associated with a computer system of said user;

wherein said database is updated by said transaction.

17. A method to enhance security of user identification during a transaction, and optionally to reward said user for making said transaction including displaying advertising material relevant to a profile maintained for said user that is updated by a present purchase made by said user during said transaction, the method including the following steps:

(a) providing at a point of said transaction a self-contained microprocessor-controlled modular signature capture device that includes a writing/display unit that includes a pad responsive to writing thereon with a stylus, and includes a display superimposed with said pad such that writing on said pad appears as an image on said display, said device including interface circuitry that permits operatively coupling with at least one add-on accessory, said further including communication interface circuitry enabling said device to be coupled to a communications link for data transfer to an electronic system;

(b) coupling a host electronic system via said communications link to said device, said host electronic system maintaining a user profile for users making purchases with devices provided at step (a);

(c) entering purchase data for said transaction into said host electronic system, whereupon an amount due is determined, and whereupon said user profile for said user is updated;

(d) said user entering into said transaction introducing a PIN, previously stored within a user card readable by said device, into said device using said card;

(e) said user in realtime now entering a user PIN into said device;

(f) whereupon if said device confirms identity between said PIN introduced at step (d) and at step (e) said user is confirmed as owner of said card and said transaction may proceed further, but if said identity is not confirmed, said transaction is aborted;

(g) said device reading from said card said user's account number and account location and communicating this information to said host electronic system;

(h) coupling said host electronic system to a central clearinghouse for confirmation substantially in realtime that said user's said account number bears sufficient funds for said transaction;

(i) if sufficient funds in said account number are present and if said transaction is not otherwise aborted, debiting said account number by an amount for said transaction, and transferring said amount to an account of a provider of goods or services represented by said transaction; and (j) said host electronic system selecting during said transaction, based upon said user profile for said user, media for immediate presentation to said user.

18. The method of claim 17, wherein:

said card is selected from the group consisting of (i) a card carrying at least two stripes of magnetic media, and (ii) a smartcard;

the user input PIN is protected by at least one technique selected from the group consisting of (i) DES-encrypting PIN data input to said device by said user, (ii) Master/Session key managing PIN data input to said device by said user, (iii) DUKPT key managing PIN data input to said device by said user, (iv) using as PIN data input to said device by said user a device-generated token representing a device-scanned portion of a finger of said user, wherein said token is compared by said device with a card-stored previously generated token of a portion of said finger, and (v) erasing user data stored in device upon detection of tampering with a housing enclosing said device.

19. The method of claim 17, further including:

(k) said host electronic system presenting to said device at least one presentation selected from the group consisting of (i) an advertisement presented on said display, (ii) an animated video sequence presented on said display, (iii) an oral message presented via a transducer in said display, (iv) a promotional message presented on said display, (v) a discount coupon presented on said display, (vi) a discount coupon printed by a printer coupled to said device, and (vii) a discount coupon printed by a printer in a said accessory coupled to said device.

20. The method of claim 17, further including at least one step selected from the group consisting of:

(k) said host generating and causing to be stored a profile of purchases evidenced by transactions made by said user, wherein said profile is useable to determine effectiveness of advertising and/or display of items comprising said transaction; and (l) said host generating and causing to be communicated to a user-specified information link user-useable accounting data evidencing said transaction, said accounting data used to update an accounting database maintained for said user.

*21. The device of claim 1, wherein said bus is an ISA-compatible bus.*

*22. The system of claim 7, wherein said bus is an ISA-compatible bus.*

*23. A method of transacting business with a debit card, the method comprising the following steps:*

*(a) providing a self-contained modular signature capture device, able to function without a host system, said device including a user-interactive display, and including a card reader to read information stored in a user's transaction card, said transaction card selected from a group consisting of user's debit card, a user's credit card;*

*(b) generating on said display an image prompting a user to present a user transaction card to said card reader;*

*(c) said device operating in a transaction mode in which said transaction card is deemed a user's debit card; and*

*(d) processing a transaction for said user in which value for said transaction is debited against said user's debit card as a debit card transaction.*

*24. The method of claim 23, wherein when said device is operating in said transaction mode, said device prompts said user to enter a user PIN.*

*25. The method of claim 23, further including allowing said user to select a transaction mode in which value for said transaction is charged against said transaction card as a credit card transaction.*

*26. The method of claim 23, further including allowing said user to select a transaction mode in which value for said transaction is charged against said transaction card as a smart card transaction.*

*27. The method of claim 23, further including:*

*generating on said display an image prompting said user to input a PIN associated with said transaction card;*

*confirming validity of said PIN for said user; and*

*processing said transaction only if said PIN is confirmed valid for said user.*

*28. The method of claim 27, wherein said PIN is a biometric token for said user.*

*29. A system usable at a point of transaction to memorialize a transaction, to facilitate realtime completion of said transaction, and enable instant presentation of viewable media targeted to a user of said system based upon a profile of said user compiled from information including past transaction purchases made by said user with said system, the system comprising:*

*a self-contained modular signature capture device, including:*

*a writing/display unit including a pad responsive to writing thereon with a passive stylus, and including a liquid crystal display superimposed with said pad;*

*a central processor unit (CPU) coupled to read-only-memory (ROM) storing at least one software executable by said CPU for operating said device, and further coupled to random access memory (RAM), and to said writing/display unit;*

*a bus coupled to said CPU;*

*electronic circuitry coupled to said bus and responsive to said writing so as to present on said display an image of said writing, in which said writing appears to a user to result in said image;*

*interface circuitry coupled to said bus to permit operatively coupling at least one add-on accessory to said device;*

*at least one said add-on accessory, coupled to said interface circuitry;*

*a magnetic card sub-unit, coupleable to said bus, to permit magnetically reading and writing data to a card carrying at least two stripes of magnetic media;*

*communication interface circuitry, coupled to said bus, to permit coupling said device to a communications link for data transfer to an electronic host system, said device being operable without being coupled to said electronic host system; and*

*an electronic host system, associated with said point of transaction, coupled to said device via said communication interface circuitry such that a point of sale transaction itemized by said device may be entered into said host system via said communication interface circuitry, said host system using data received from said device and received from said system during past transactions to generate and store for said user a user profile that is updatable with each succeeding purchase by said user using said system;*

*wherein payment for said transaction is accomplished by a user inputting user PIN into said device and writing a signature on said pad;*

*means for comparing the user input PIN with a previously stored PIN for aid user, and, if there is substantial identity between said user PIN and said previously stored PIN, permitting said transaction to further proceed;*

*wherein during said transaction, transferred said data enables said host system to select from said user profile media for immediate presentation and display to aid user.*

*30. The system of claim 29, wherein:*

*said card is a smart card; and*

*said previously stored PIN is stored within said smart card.*

*31. The system of claim 29, wherein:*

*said card includes at least two magnetic stripes of magnetic media; and*

*said previously stored PIN is stored within said host system.*

*32. The system of claim 29, wherein:*

*said means for comparing and permitting is provided by said electronic host system.*

*33. The system of claim 29, wherein:*

*said card is usable as a debit card.*

* * * * *